Nov. 13, 1962  E. STOLIGROSZ  3,063,441
COOKING APPARATUS
Filed Aug. 26, 1959  3 Sheets-Sheet 1

INVENTOR:
EUGENE STOLIGROSZ
BY
ATT'YS

Nov. 13, 1962  E. STOLIGROSZ  3,063,441
COOKING APPARATUS
Filed Aug. 26, 1959  3 Sheets-Sheet 2
FIG. 6
FIG. 2
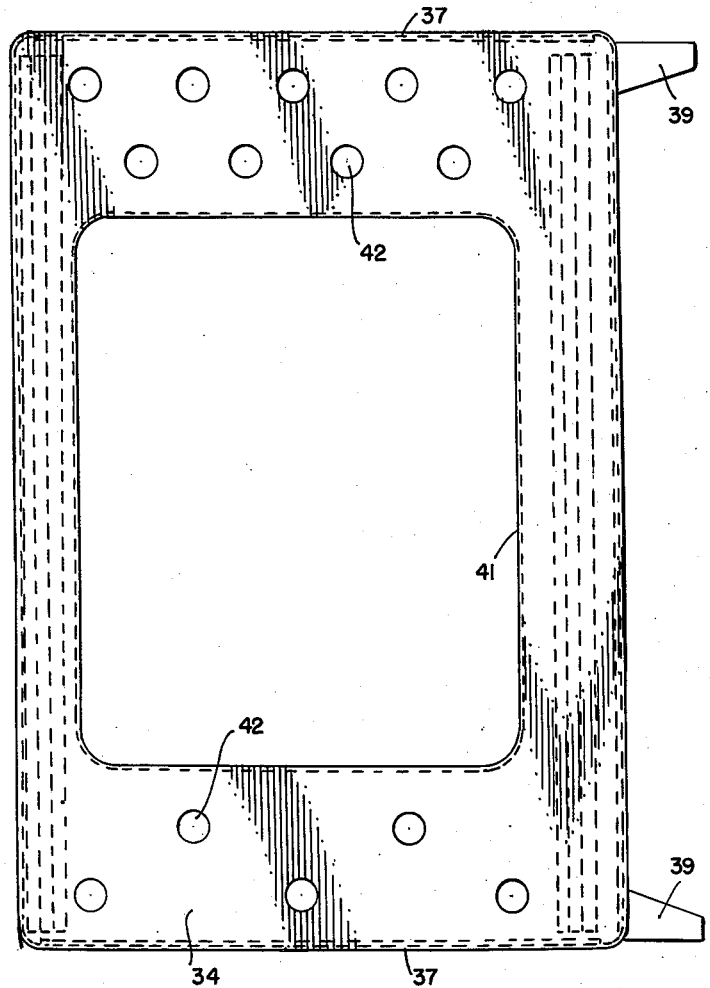
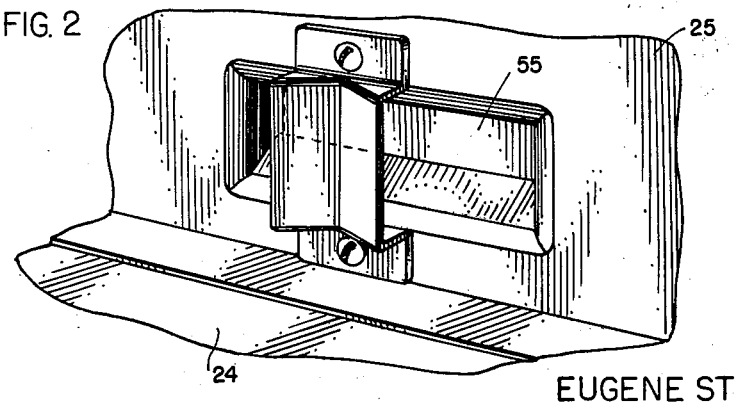
INVENTOR:
EUGENE STOLIGROSZ
BY
ATT'YS Nov. 13, 1962 E. STOLIGROSZ 3,063,441
COOKING APPARATUS
Filed Aug. 26, 1959 3 Sheets-Sheet 3
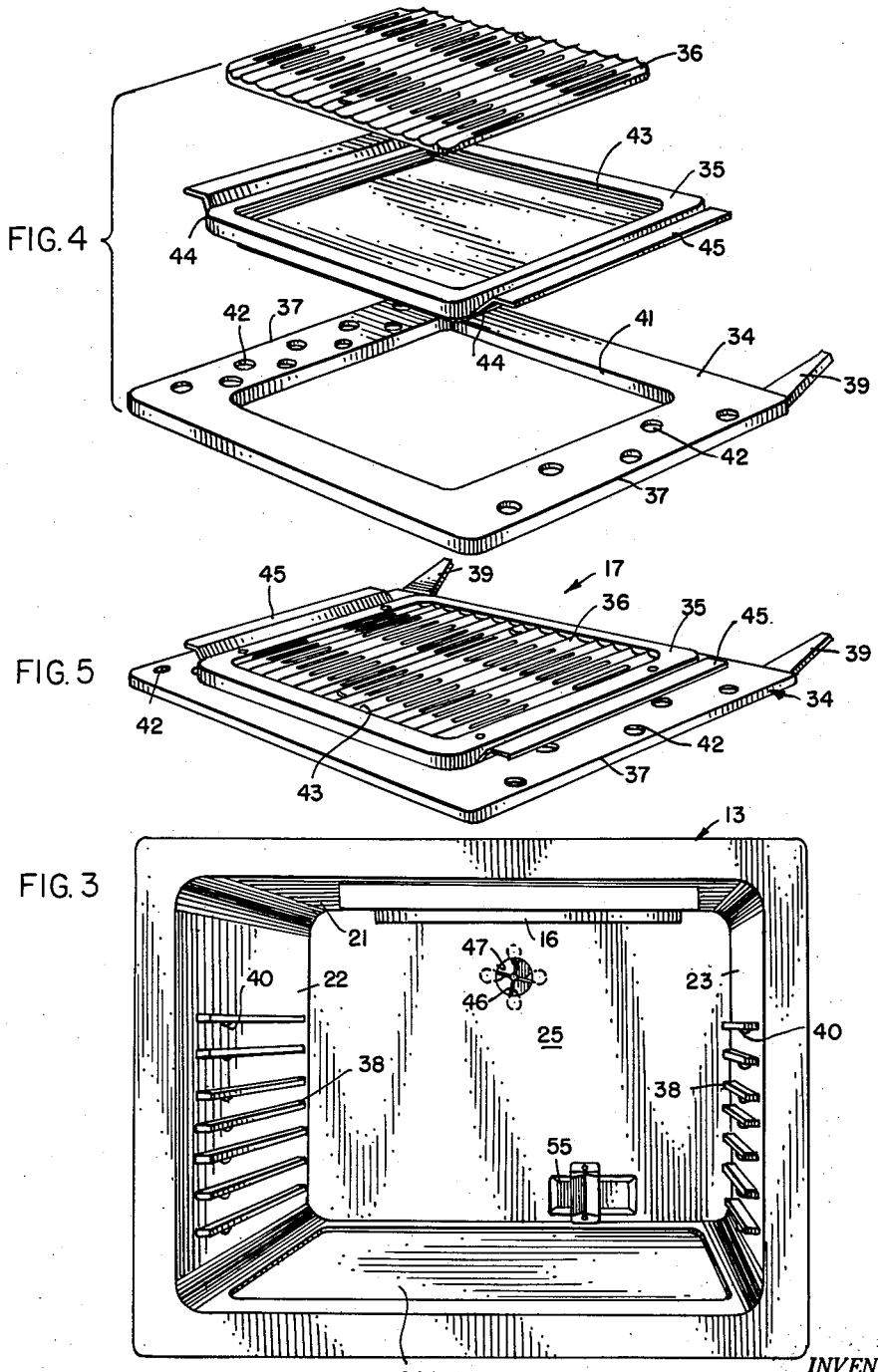
INVENTOR:
EUGENE STOLIGROSZ
BY
ATT'YS United States Patent Office 3,063,441
Patented Nov. 13, 1962

3,063,441
COOKING APPARATUS
Eugene Stoligrosz, St. Joseph, Mich., assignor to Whirlpool Corporation, a corporation of Delaware
Filed Aug. 26, 1959, Ser. No. 836,229
3 Claims. (Cl. 126—21)

This invention relates to ovens and in particular to cooking ovens arranged for broiling and baking operation.

One feature of the invention is the provision of cooking apparatus including an enclosure defining a cooking chamber, heating means at the top of the enclosure confronting the chamber for heating the same, means dividing the chamber into an upper broiler portion arranged to receive radiant heat energy from the heating means and a lower baking, or roasting portion, and air moving means selectably operable for forcibly circulating air between the chamber portions whereby heat energy is convectively transferred to the baking from the broiler portion.

Another feature is to provide such a cooking apparatus wherein the chamber dividing means is perforate and passes air upwardly from the baking portion of the chamber to the broiling portion thereof.

Still another feature of the invention is the provision of such a cooking apparatus wherein the air moving means includes a fan disposed in means defining an air passage extending between the broiler portion and the bottom of the baking portion of the chamber.

A further feature of the invention is the provision of such a cooking apparatus including means admitting atmospheric air to the chamber with the oven door closed and means discharging air from the chamber to atmosphere, the admitting and discharging means being arranged to pass air at a preselected small volume rate of flow respectively into and from the chamber.

A yet further feature of the invention is the provision of such cooking apparatus wherein the chamber dividing means includes a panel extending horizontally across the chamber and supported on the enclosure, the panel having a central opening, a broiler pan, and a carrier on the panel supporting the broiler pan and extending across the panel opening to preclude transmission of radiant energy from the heating means to the baking portion of the chamber.

A still further feature is the provision of such cooking apparatus wherein the carrier is downwardly dished and receives the broiler pan therein, and wherein the dividing means further includes a support resting on the panel and disposing the carrier above the panel to permit air flow thereunder, the support having a pair of handles for manually carrying the carrier and broiler pan therein when desired.

Other features and advantages of the invention will be apparent from the following description taken in connection with the accompanying drawings wherein:

FIGURE 2 is a fragmentary enlarged perspective view of a portion of the enclosure defining the cooking chamber, illustrating the heated air inlet to the baking portion thereof.

FIGURE 3 is a perspective view taken slightly to the right of center of the cooking chamber with the broiler pan assembly removed.

FIGURE 4 is an exploded perspective view of the broiler pan assembly.

FIGURE 5 is a perspective view of the assembled broiler pan assembly.

FIGURE 6 is a plan of the panel of the dividing means.

Figure 1:
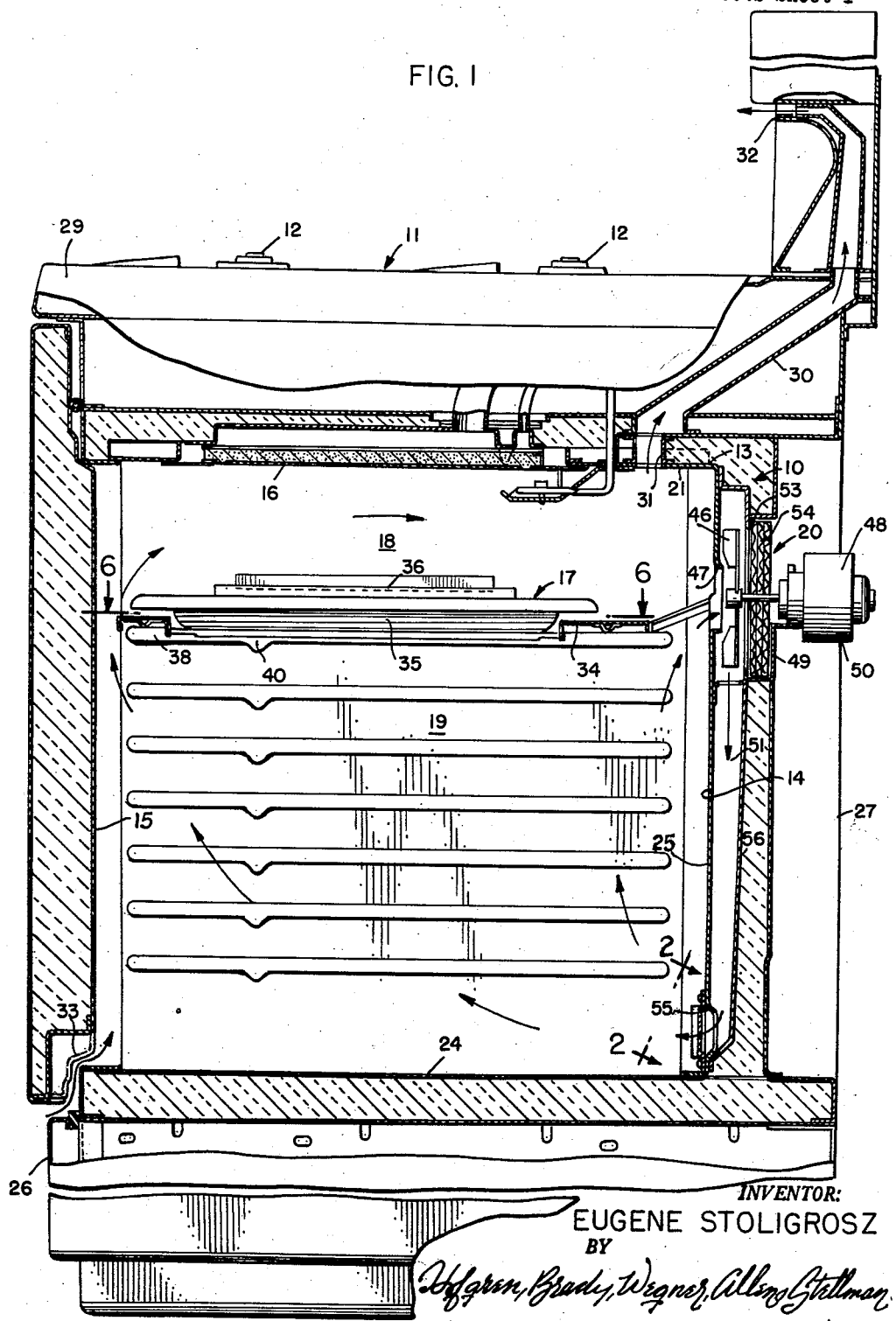
FIGURE 1 is a fragmentary vertical section of a cooking apparatus embodying the invention, with parts broken away to facilitate the illustration thereof.

As shown in FIGURE 1 of the drawings, a cooking apparatus generally designated 10 is installed in a cooking range generally designated 11 provided with suitable surface burners 12. The invention relates to the oven means of the range and comprehends an oven structure including an enclosure 13 defining the oven chamber 14. Enclosure 13 is provided with a front door 15 providing access to the oven chamber as desired. A heating means comprising a ceramic porous plate gas burner 16 is mounted in the top of enclosure 13 and downwardly confronts chamber 14 for heating the same. Spaced below oven burner 16 and extending transversely across oven chamber 14 is a broiler pan assembly device generally designated by arrow 17. Device 17 effectively divides oven chamber 14 into an upper broiler portion 18 and a lower baking, or roasting, portion 19. Upper chamber portion 18 is heated radiantly by the oven burner 16 and lower chamber portion 19 is heated convectively by hot air heated in upper chamber portion 18 and delivered to lower chamber portion 19 by an air moving means generally designated by arrow 20. The size and outline configuration of broiler pan assembly 17 is similar to that of burner 16 to effectively preclude the direct transfer of radiant heat energy from burner 16 to lower chamber portion 19 thereby permitting baking and roasting operations in an improved controlled manner in the lower chamber portion.

More specifically, enclosure 13 includes an upper wall 21, a left side wall 22, a right side wall 23, a bottom wall 24 and a rear wall 25, each of which walls and door 15 being provided with insulation filling. The enclosure 13 is carried on a conventional base 26. The range is further provided with a top structure 29 in which burners 12 are mounted and through which upwardly extends a flue 30 communicating at its lower end 31 with the top of chamber portion 18 and at its upper end 32 with the ambient atmosphere. A small recess 33 is provided in the center midportion of the lower edge of door 15 to define an opening between door 15 and bottom wall 24 to permit air to enter the bottom of baking chamber portion 19 when door 15 is in the closed position, as seen in FIGURE 1.

As indicated briefly above, broiler pan assembly 17 serves to divide the oven chamber 14 into upper and lower portions 18 and 19. As best seen in FIGURES 1, 4, 5 and 6, the broiler pan assembly includes a supporting rack or panel 34, a combined carrier and drip pan 35 and a slotted broiler pan 36. Panel 34 comprises a rigid plate having lateral edges 37 slidably engageable with selected corresponding pairs of plurality of horizontally extending rails 38 secured to side walls 22 and 23 of enclosure 13. At its rear, the panel 34 is provided with a pair of rearwardly and upwardly projecting fingers 39 co-operating with depending lobes 40 on rails 38 for releasably retaining the panel in association with the rails. Panel 34 is provided centrally with a rectangular opening 41, and with a plurality of vent openings 42 between openings 41 and side edges 37.

Carrier 35 comprises a rigid rectangular member having a downwardly dished central drip pan portion 43 peripherally slightly smaller than opening 41 of panel 34 into which it projects, as best seen in FIGURE 1. The carrier 35 is spaced above panel 34 by means of a pair of wire supports 44 provided at their outer ends with a handle 45 for use in lifting the carrier from the panel 34. Broiler pan 36 comprises a generally conventional slotted broiler pan having a scalloped top surface and a rectangular periphery and is adapted to be received in dished portion 43 of the carrier 35.

Referring now more specifically to FIGURES 1, 2 and 3, air moving means 20 comprises a fan 46 disposed rearwardly of an opening 47 in enclosure rear wall 25 spaced a small distance below top wall 21 of the enclosure. The fan is driven by a suitable motor 48 mounted on a bracket 49 secured to rear wall 25. Air is drawn by fan 46 into an air passage 51 defined by a duct wall 52 in rear wall 25 of the enclosure 13. Directly behind fan 46, duct wall 52 is provided with an opening 53 across which extends a suitable insulating panel 54. At its lower end, air passage 51 communicates with the bottom of baking chamber portion 19 through an inlet 55 in enclosure rear wall 25. A deflector 56 is secured across the inlet 55 to direct the air laterally into chamber portion 19 and cause the air to move transversely across the chamber as it passes upwardly to chamber portion 18.

Cooking apparatus 10 functions as follows. To perform a broiling operation therewith, the footstuff to be broiled (not shown) is placed on broiler pan 36 with the broiler device arranged as shown in FIGURE 1. The radiant heat energy provided by the oven burner 16 effects a clean and efficient broiling of the object. During the broiling operation, motor 48 is inoperative and air enters through recess 33 adjacent the lower edge of door 15 to pass by convection upwardly through openings 42 in support panel 34 of the broiler device and through opening 41 thereof under carrier 35 to broiler chamber portion 19. This air mixes with smoke evolved from the foodstuff during the broiling operation and passes therewith to adjacent the lower surface of burner 16 where combustion of the smoke occurs, assuring that the effluent passing upwardly from chamber 18 through flue 30 and discharged to the atmosphere from flue end 32 is substantially smokeless.

When it is desired to utilize cooking apparatus 10 for baking or roasting foodstuffs in chamber portion 19, the object is placed on a suitable rack (not shown) carried on a selected pair of rails 38 therein. Motor 48 is energized to operate fan 46 and cause air heated in upper chamber portion 18 to pass through opening 47 in enclosure rear wall 25, and be directed by the fan downwardly through the air passage 51 to pass through inlet 55 into the lower portion of chamber portion 19. The hot air then passes through the baking chamber diagonally upwardly to the front portion thereof adjacent door 15, and upwardly through openings 42 in support panel 34 as well as through central opening 41 thereof under carrier 35. As best seen in FIGURE 1, a small portion of the air passes directly from chamber 19 into the lowermost portion of opening 47 behind broiler device 17 which is spaced slightly forwardly of enclosure rear wall 25. This circulation of the air completely through the chamber portion 19 effects an evenly distributed heating of the chamber portion. At the same time, a small amount of air enters chamber portion 19 through opening 33 to replace a corresponding small amount of air which passes upwardly through flue 30 to be discharged from end 32 thereof during the baking operation. In each of the broiling and baking operations, approximately 10% to 25% of the volume rate of flow of the air circulated through the oven chamber is discharged to atmosphere therefrom and replaced with fresh air. Thus, smoke and other gases evolved during the cooking operations are constantly eliminated from the oven chamber.

During a baking or roasting operation, the carrier 35 of the broiler device serves to preclude transfer of radiant energy from power burner 16 through panel opening 41 to the lower chamber portion 19 permitting the heating thereof to be primarily convective. During a broiling operation, the heating of the food is primarily radiant. During each of the cooking operations, the door 15 may be in the fully closed position.

While I have shown and described one embodiment of my invention, it is to be understood that it is capable of many modifications. Changes, therefore, in the construction and arrangement may be made without departing from the spirit and scope of the invention as defined in the appended claims.

The embodiment of the invention in which an exclusive property or privilege is claimed is defined as follows:

1. Cooking apparatus comprising: an enclosure defining a cooking chamber; heating means at the top of the chamber for heating the same; means dividing the chamber into an upper broiler portion arranged to receive radiant heat energy from the heating means, and and a lower baking portion; and air moving means selectably operable for forcibly circulating air between said portions whereby heat energy is convectively transferred to said baking portion, said dividing means including a panel extending horizontally across the chamber and supported on the enclosure, the panel having a central opening, a broiler pan, a carrier on the panel supporting the broiler pan and extending across said panel opening to preclude substantially transmission of radiant energy from the heating means to said baking portion of the chamber, and means spacing the carrier slightly above said panel to permit air flow through said opening.

2. Cooking apparatus comprising: an enclosure defining a cooking chamber; heating means at the top of the chamber for heating the same; means dividing the chamber into an upper portion arranged to receive radiant heat energy from the heating means, and a lower portion, said dividing means including a panel extending horizontally across the chamber and removably supported on the enclosure, the panel having a central opening, a broiler pan, a downwardly dished carrier on the panel supporting the broiler pan therein and extending across said panel opening to preclude substantially transmission of radiant energy from the heating means to said lower portion of the chamber, and supporting means resting on the panel and disposing the carrier above the panel to permit air flow under the carrier and through said opening; and means for delivering air heated by said heating means to said lower portion of the chamber.

3. The cooking apparatus of claim 2 wherein the supporting means includes a pair of handles for use in manually carrying the carrier and broiler pan therein.

References Cited in the file of this patent
UNITED STATES PATENTS

| | | |
|---|---|---|
| 1,446,994 | Sieben | Feb. 27, 1923 |
| 1,889,218 | Reedy | Nov. 29, 1932 |
| 1,938,470 | Teller et al. | Dec. 5, 1933 |
| 1,963,817 | Wiederhold | June 19, 1934 |
| 2,367,007 | Cossin | Jan. 9, 1945 |
| 2,490,076 | Maxson | Dec. 6, 1949 |
| 2,767,298 | Fry | Oct. 16, 1956 |
| 2,862,095 | Scotfield | Nov. 25, 1958 |
| 2,880,716 | Brodbeck | Apr. 7, 1959 |
| 2,908,267 | Hess | Oct. 13, 1959 |

FOREIGN PATENTS

| | | |
|---|---|---|
| 6,749 | Great Britain | 1905 |
| 742,248 | Great Britain | Dec. 21, 1955 |